United States Patent
Uchida et al.

(10) Patent No.: US 12,234,336 B2
(45) Date of Patent: Feb. 25, 2025

(54) BINDER FOR INORGANIC FIBERS AND INORGANIC FIBER MAT

(71) Applicant: NISSIN CHEMICAL INDUSTRY CO., LTD., Echizen (JP)

(72) Inventors: Koki Uchida, Echizen (JP); Yoshinori Maki, Echizen (JP); Yasuhiro Mitta, Echizen (JP)

(73) Assignee: NISSIN CHEMICAL INDUSTRY CO., LTD., Echizen (JP)

( * ) Notice: Subject to any disclaimer, the term of this patent is extended or adjusted under 35 U.S.C. 154(b) by 637 days.

(21) Appl. No.: 17/415,202

(22) PCT Filed: Dec. 12, 2019

(86) PCT No.: PCT/JP2019/048673
§ 371 (c)(1),
(2) Date: Jun. 17, 2021

(87) PCT Pub. No.: WO2020/129801
PCT Pub. Date: Jun. 25, 2020

(65) Prior Publication Data
US 2022/0056226 A1 Feb. 24, 2022

(30) Foreign Application Priority Data
Dec. 18, 2018 (JP) ................. 2018-236049

(51) Int. Cl.
| | | |
|---|---|---|
| *C08J 5/24* | (2006.01) | |
| *C08K 3/36* | (2006.01) | |
| *C08L 29/04* | (2006.01) | |
| *C08L 35/00* | (2006.01) | |
| *C09D 129/04* | (2006.01) | |
| *C09J 11/04* | (2006.01) | |
| *C09J 11/08* | (2006.01) | |
| *C09J 129/04* | (2006.01) | |
| *D04H 1/413* | (2012.01) | |
| *D04H 1/4209* | (2012.01) | |
| *D04H 1/4218* | (2012.01) | |
| *D04H 1/587* | (2012.01) | |
| *D04H 1/64* | (2012.01) | |
| *D06M 11/79* | (2006.01) | |
| *D06M 15/333* | (2006.01) | |

(52) U.S. Cl.
CPC ................. *C08J 5/243* (2021.05); *C08K 3/36* (2013.01); *C08L 29/04* (2013.01); *C08L 35/00* (2013.01); *C09D 129/04* (2013.01); *C09J 11/04* (2013.01); *C09J 11/08* (2013.01); *C09J 129/04* (2013.01); *D04H 1/413* (2013.01); *D04H 1/4209* (2013.01); *D04H 1/4218* (2013.01); *D04H 1/587* (2013.01); *D04H 1/64* (2013.01); *D06M 11/79* (2013.01); *D06M 15/333* (2013.01); *C08J 2329/04* (2013.01); *C08J 2435/02* (2013.01)

(58) Field of Classification Search
CPC .... C08J 5/243; C08J 2329/04; C08J 2435/02; C08K 3/36; C08L 29/04; C08L 35/00; C09D 129/04; D04H 1/413; D04H 1/64; D04H 1/4209; D04H 1/587; D04H 1/4218; D06M 15/333; D06M 11/79; C09J 11/04; C09J 11/08; C09J 129/04
See application file for complete search history.

(56) References Cited

U.S. PATENT DOCUMENTS

| | | | | |
|---|---|---|---|---|
| 4,333,564 | A | * | 6/1982 | Hertl .................... G01N 33/491 |
| | | | | 252/60 |
| 5,317,052 | A | | 5/1994 | Ohba et al. |
| 2013/0023603 | A1 | * | 1/2013 | Walter .................. C08G 59/38 |
| | | | | 523/428 |
| 2013/0255210 | A1 | | 10/2013 | Okabe et al. |

FOREIGN PATENT DOCUMENTS

| | | | |
|---|---|---|---|
| CA | 2803625 | * | 1/2012 |
| CN | 108930094 A | | 12/2018 |
| EP | 1203122 | * | 4/2003 |
| JP | 58-70760 A | | 4/1983 |
| JP | 59-187677 A | | 10/1984 |
| JP | 60-46951 A | | 3/1985 |
| JP | 5-58028 A | | 3/1993 |
| JP | 8-104550 A | | 4/1996 |
| JP | 2005-299013 A | | 10/2005 |

(Continued)

OTHER PUBLICATIONS

Machine English translation of JP 2008-174891, Inoue et al., Jul. 31, 2008.*
Machine English translation of CN 108930094, Arima et al., Dec. 4, 2018.*
International Search Report, issued in PCT/JP2019/048673, PCT/ISA/210, dated Mar. 3, 2020.
Written Opinion of the International Searching Authority, issued in PCT/JP2019/048673, PCT/ISA/237, dated Mar. 3, 2020.
Chinese Office Action and Search Report for Chinese Application No. 201980082852.0, dated Jul. 15, 2022.
Extended European Search Report for European Application No. 19900831.9, dated Aug. 5, 2022.

(Continued)

*Primary Examiner* — Patrick D Niland
(74) *Attorney, Agent, or Firm* — Birch, Stewart, Kolasch & Birch, LLP

(57) ABSTRACT

The present invention provides a binder that is for inorganic fibers and that is characterized by containing (A) 100 parts by mass of a polyvinyl alcohol resin having a degree of polymerization of 100-3500, (B) 1-50 parts by mass of colloidal silica having an average particle size of 100 nm or less, and (C) 3 parts by mass or more of an ammonia-modified copolymer containing maleic anhydride. By using the binder for inorganic fibers according to the present invention, an inorganic fiber mat having resiliency comparable to that of phenolic resins can be fabricated, and the amount of volatile organic compounds released from the inorganic fiber mat is very small.

10 Claims, 1 Drawing Sheet

(56) References Cited

FOREIGN PATENT DOCUMENTS

| | | |
|---|---|---|
| JP | 2006-89906 A | 4/2006 |
| JP | 2008-145692 A | 6/2008 |
| JP | 2008-174891 A | 7/2008 |
| JP | 2011-153395 A | 8/2011 |
| JP | 2012-136385 A | 7/2012 |
| JP | 2013-213463 A | 10/2013 |
| JP | 2016-108707 A | 6/2016 |
| JP | 2016-108708 A | 6/2016 |
| JP | 2019-85672 A | 6/2019 |
| WO | WO 2004/085729 A1 | 10/2004 |
| WO | WO 2005/092814 A1 | 10/2005 |

OTHER PUBLICATIONS

Noaa Office of Response and Restoration, "Silica, Amorphous", CAMEO Chemicals, NOAA, Jan. 1, 2022, pp. 1-9, https://cameochemicals.noaa.gov/chemical/25061.

Korean Office Action for Korean Application No. 10-2021-7021911, dated Aug. 26, 2024, with English translation.

* cited by examiner

BINDER FOR INORGANIC FIBERS AND INORGANIC FIBER MAT

TECHNICAL FIELD

This invention relates to a mineral fiber-treating binder and a mineral fiber mat treated therewith. More particularly, it relates to a mineral fiber-treating binder and a mineral fiber mat treated therewith, the mineral fiber mat being suitable for use as thermal insulating and sound-proofing materials in buildings and being endowed with minimized release of volatile organic compounds, a sufficient thickness, and good recovery.

BACKGROUND ART

From the past, mats made of mineral fibers such as glass wool and mineral wool are widely used as thermal insulating and sound-proofing materials in industrial and building applications. Mineral fiber mats are generally manufactured by treating mineral fibers with a binder composed mainly of a water-soluble phenolic resin for binding them together and shaping the material into a mat (for example, JP-A S58-070760: Patent Document 1).

However, the water-soluble phenolic resin serving as the binder main component, in which formaldehyde is generally used as a crosslinker, suffers from the problem that some formaldehyde remains unreacted in the mineral fiber mat after the binder is heat cured. Another problem is that even after curing, hydrolysis and condensation reactions of the binder take place to generate formaldehyde. In this case, formaldehyde will be released from upper and side surfaces of the mineral fiber mat after manufacture.

With respect to formaldehyde and similar volatile organic compounds which will readily volatilize into air at normal temperature and pressure, recently the contamination of indoor air with volatile organic compounds is revealed, and health hazards such as sick building syndrome caused, in part, by volatile organic compounds are alerted. Thus the amount of formaldehyde released from building materials is legally regulated. For the purpose of minimizing the release of formaldehyde and other volatile organic compounds from building materials, it is believed effective to minimize their content.

Now that the volatile organic compound released from mineral fiber mats is mostly formaldehyde in the binder, the binder composition must be converted to a formaldehyde-free composition before the outstanding problem can be solved. However, the conventional mineral fiber mats treated with phenolic resin-based binders have advantages including inexpensive raw materials, an excellent recovery rate and a very high surface strength. The binder of formaldehyde-free composition should ensure equivalent performance, which is a difficult task.

To address the outstanding problem, JP-A 2005-299013 (Patent Document 2) proposes a binder composed mainly of an acrylic resin-based emulsion, and JP-A 2006-089906 (Patent Document 3) proposes a binder composed of a vinyl copolymer having a functional group such as carboxy. Mineral fiber mats prepared using these binders, however, have a poor recovery rate and surface strength as compared with the mineral fiber mats treated with water-soluble phenolic resin-based binders. JP-A 2011-153395 (Patent Document 4) of the applicant discloses a binder comprising a water-soluble high molecular weight compound having a hydroxy group and a boron compound. Mineral fiber mats prepared using this binder overcome the problems associated with volatile organic compounds, but are slightly inferior in recovery rate and surface strength to those treated with water-soluble phenolic resins.

WO 2005/092814 (Patent Document 5) proposes an unsaturated copolymer of maleic anhydride with an unsaturated monomer (specifically an unsaturated copolymer of maleic anhydride with butadiene). JP-A 2012-136385 (Patent Document 6) proposes a copolymer of maleic anhydride with an acrylate. JP-A 2016-108707 (Patent Document 7) and JP-A 2016-108708 (Patent Document 8) propose maleic acid copolymers (probably monoalkyl ester form of methyl vinyl ether/maleic anhydride copolymer). JP-A S60-046951 (Patent Document 9) proposes an isobutylene/maleic anhydride copolymer. While a mineral fiber mat comprising mineral fibers is manufactured by spraying a low concentration solution of a water-soluble binder to molten glass, all of the aforementioned compounds have so low a solubility in water that adequate water-soluble binders are not always available.

PRIOR ART DOCUMENTS

Patent Documents

Patent Document 1: JP-A S58-070760
Patent Document 2: JP-A 2005-299013
Patent Document 3: JP-A 2006-089906
Patent Document 4: JP-A 2011-153395
Patent Document 5: WO 2005/092814
Patent Document 6: JP-A 2012-136385
Patent Document 7: JP-A 2016-108707
Patent Document 8: JP-A 2016-108708
Patent Document 9: JP-A S60-046951

SUMMARY OF INVENTION

Technical Problem

An object of the invention, which has been made under the above-mentioned circumstances, is to provide a mineral fiber-treating binder which enables to manufacture mineral fiber mats having good recovery, and a mineral fiber mat treated with the binder.

Solution to Problem

Making extensive investigations to attain the above object, the inventors have found that a binder comprising a polyvinyl alcohol-based resin, specific colloidal silica, and an ammonia-modified copolymer containing maleic anhydride is effective for endowing a mineral fiber mat with a recovery rate comparable to phenolic resins and for minimizing the release of volatile organic compounds. The invention is predicated on this finding.

The invention provides a mineral fiber-treating binder and a mineral fiber mat treated with the binder, as defined below.
1. A mineral fiber-treating binder comprising
   (A) 100 parts by weight of a polyvinyl alcohol-based resin having a degree of polymerization of 100 to 3,500,
   (B) 1 to 50 parts by weight of colloidal silica having an average particle size of up to 100 nm, and
   (C) at least 3 parts by weight of an ammonia-modified copolymer containing maleic to anhydride.
2. The binder of 1 wherein the polyvinyl alcohol-based resin (A) has a degree of saponification of at least 70 mol %.

3. The binder of 1 or 2 wherein the colloidal silica (B) is aluminum-modified colloidal silica.
4. The binder of any one of 1 to 3 wherein the ammonia-modified copolymer containing maleic anhydride (C) has a weight average molecular weight of 50,000 to 300,000 and has the following structural formula:

[Chem. 1]

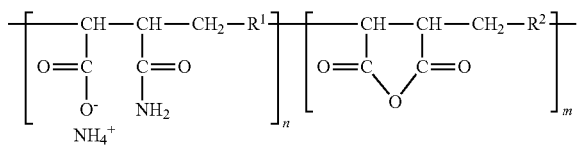

wherein $R^1$ and $R^2$ each are a straight or branched alkylene group of 2 to 5 carbon atoms and the content n is 0.1 to 3% by weight based on 100% by weight of the sum of n+m.

5. The binder of 4 wherein the ammonia-modified copolymer containing maleic anhydride (C) is an ammonia-modified isobutylene/maleic anhydride copolymer.
6. The binder of any one of 1 to 5 wherein the mineral fiber is glass wool or mineral wool.
7. A mineral fiber mat comprising mineral fibers treated with the binder of any one of 1 to 6.

Advantageous Effects of Invention

Using the inventive mineral fiber-treating binder, a mineral fiber mat having a high recovery rate can be manufactured.

DESCRIPTION OF EMBODIMENTS

Figure 1:
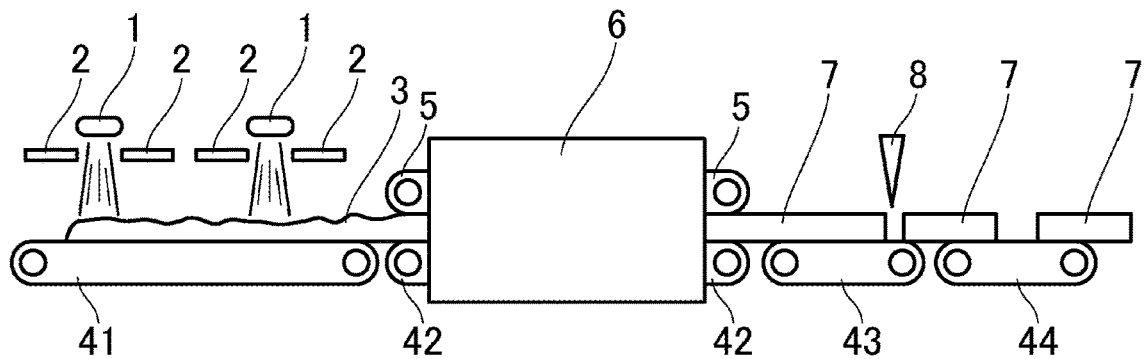
FIG. 1 is a schematic view illustrating one embodiment of a process for manufacturing a mineral fiber mat using the inventive mineral fiber-treating binder.

Now the invention is described in detail.

The invention provides a mineral fiber-treating binder comprising the following components (A) to (C):

(A) 100 parts by weight of a polyvinyl alcohol-based resin having a degree of polymerization of 100 to 3,500, (B) 1 to 50 parts by weight of colloidal silica having an average particle size of up to 100 nm, and (C) at least 3 parts by weight of an ammonia-modified copolymer containing maleic anhydride.

Component (A) is a polyvinyl alcohol-based resin which is a main component of the inventive mineral fiber-treating binder. The polyvinyl alcohol-based resin (A) should have a degree of polymerization of 100 to 3,500, preferably 100 to 2,000, and more preferably 200 to 1,800. If the degree of polymerization exceeds 3,500, problems may arise, for example, spray coating becomes deficient, necessary deposits are not obtained, and the resulting mineral fiber mat fails in full recovery. If the degree of polymerization is less than 100, problems may arise, for example, the resulting mineral fiber mat fails in full recovery. The degree of polymerization is determined as a weight average degree of polymerization by aqueous gel permeation chromatography (GPC) versus polystyrene standards. The polyvinyl alcohol-based resin preferably has a degree of saponification of at least 70 mol %, more preferably at least 80 mol % as measured according to the test method of JIS K6726. The upper limit is preferably less than 99.5 mol %. If the degree of saponification is 99.5 mol % or higher, the resin exhibits a substantial viscosity buildup at low temperature and sometimes gels.

Any commercially available products may be used as the polyvinyl alcohol-based resin (A), for example, "Poval (PVA)" by Japan Vam & Poval Co., Ltd.

Component (B) is colloidal silica having an average particle size of up to 100 nm, preferably 15 to 50 nm. Colloidal silica with an average particle size of less than 15 nm may allow for a viscosity buildup whereas colloidal silica with a size in excess of 100 nm may settle down. The colloidal silica as component (B) is, for example, colloidal silica formed by heat aging a silica sol which is obtained from double decomposition of sodium silicate with an acid or the like or passage of sodium silicate through an ion exchange resin layer, preferably aluminum-modified colloidal silica. Examples of commercially available colloidal silica include "ST series" and "MP-2040" by Nissan Chemical Corp., "Ludox TMA" by W. R. Grace Japan K.K., and "PL-01" by Fuso Chemical Co., Ltd. Herein, colloidal silica may be used alone or in a combination of two or more.

The amount of the colloidal silica (B) blended should be 1 to 50 parts by weight, preferably 3 to 40 parts by weight per 100 parts by weight of the polyvinyl alcohol-based resin (A). If the amount exceeds 50 parts by weight, a problem of gelation arises. If the amount is less than 1 part by weight, a problem of recovery lowering may arise.

Component (C) is an ammonia-modified copolymer containing maleic anhydride which functions herein as a crosslinker. Although the ammonia-modified copolymer containing maleic anhydride (C) is not particularly limited, copolymers having the following general formula are exemplary.

[Chem. 2]

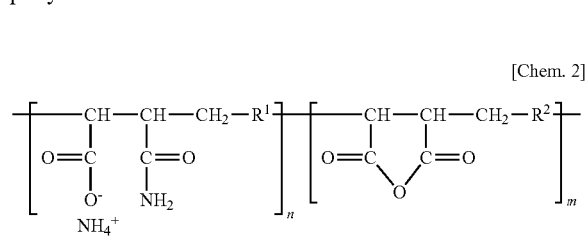

Herein, $R^1$ and $R^2$ each are a straight or branched alkylene group of 2 to 5 carbon atoms, examples of which include ethylene, propylene, isopropylene, isobutylene, ethylene-propylene, and butadiene. $R^1$ and $R^2$ may be the same or different.

Examples of component (C) include ammonia-modified copolymers of maleic anhydride with isobutylene, isopropylene, ethylene, ethylene-propylene, and butadiene. Especially preferred are ammonia-modified isobutylene/maleic anhydride copolymers having the following structural formula.

[Chem. 3]

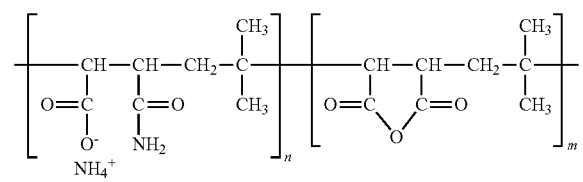

The ammonia-modified copolymer containing maleic anhydride as component (C) preferably has a weight average molecular weight of 50,000 to 300,000, more preferably 50,000 to 200,000, and most preferably 50,000 to 100,000. The weight average molecular weight is determined by aqueous gel permeation chromatography (GPC) versus polystyrene standards.

In the above formulae, n and m designate weight percentages, and n is preferably 0.1 to 3% by weight, more preferably 0.3 to 2% by weight, and most preferably 0.5 to 1% by weight based on the sum of n+m which is 100% by weight.

The content of the ammonia-modified copolymer containing maleic anhydride (C) should be at least 3 parts by weight, preferably 3 to 20 parts by weight, even more preferably 3 to 10 parts by weight per 100 parts by weight of the polyvinyl alcohol-based resin (A). If the amount of the ammonia-modified copolymer containing maleic anhydride is less than 3 parts by weight, problems such as insufficient crosslinking may arise. When the amount exceeds 20 parts by weight, no problems arise with respect to the miscibility with the polyvinyl alcohol-based resin (A), but the aqueous treatment solution can be yellowed, leading to a lowering of product quality and even a cost increase.

Any commercially available products may be used as the maleic anhydride-containing copolymer (C), for example, "ISOBAM" by Kuraray Co., Ltd.

Besides the polyvinyl alcohol-based resin (A), the colloidal silica (B), and the ammonia-modified copolymer containing maleic anhydride (C), additives such as water retainers (e.g., urea), silane coupling agents, water repellents, pH modifiers, and colorants may be added to the inventive mineral fiber-treating binder if desired. The additives may be added in arbitrary amounts as long as the benefits of the invention are not impaired.

On use, the mineral fiber-treating binder is preferably dissolved in water to form an aqueous solution of the binder. The aqueous solution of the binder preferably has a viscosity of 1 to 100 mPa·s at 25° C., more preferably 1 to 50 mPa·s at 25° C. Notably, the viscosity is measured by a rotational viscometer. If the viscosity is more than 100 mPa·s, sometimes spraying or discharging becomes deficient so that the amount of the binder deposited during treatment may be reduced, failing to obtain the desired effects of the invention. The concentration of the binder is preferably up to 10% by weight, more preferably up to 5% by weight, and most preferably up to 3% by weight.

Also the aqueous solution of the mineral fiber-treating binder is preferably at pH 4 to 10, more preferably pH 4 to 8. If the pH is outside the range, a crosslinking ability may alter to affect the recovery performance.

The mineral fiber-treating binder is applicable to a wide variety of mineral fibers, with better results when applied to glass wool and mineral wool.

The mineral fiber mat of the invention is manufactured by treating mineral fibers with the mineral fiber-treating binder. The mineral fibers used in the mineral fiber mat are not particularly limited, but preferably selected from glass wool and mineral wool.

The method for forming mineral fibers may be selected from prior art well-known methods such as centrifugal and blow-off methods. The mineral fiber mat may have a density which is commonly found in ordinary thermal insulating and sound-proofing materials, preferably up to 40 kg/m$^3$, and more preferably up to 32 kg/m$^3$.

The mineral fiber-treating binder is preferably used in an amount of 1 to 10% by weight, more preferably 1 to 5% by weight, calculated as solids, based on the weight of mineral fibers. If the amount of the binder is less than 1% by weight, problems may arise such as formation of less recoverable mineral fiber mats. If the amount exceeds 10% by weight, problems may arise such as formation of hard collapsed mineral fiber mats.

Figure 2:
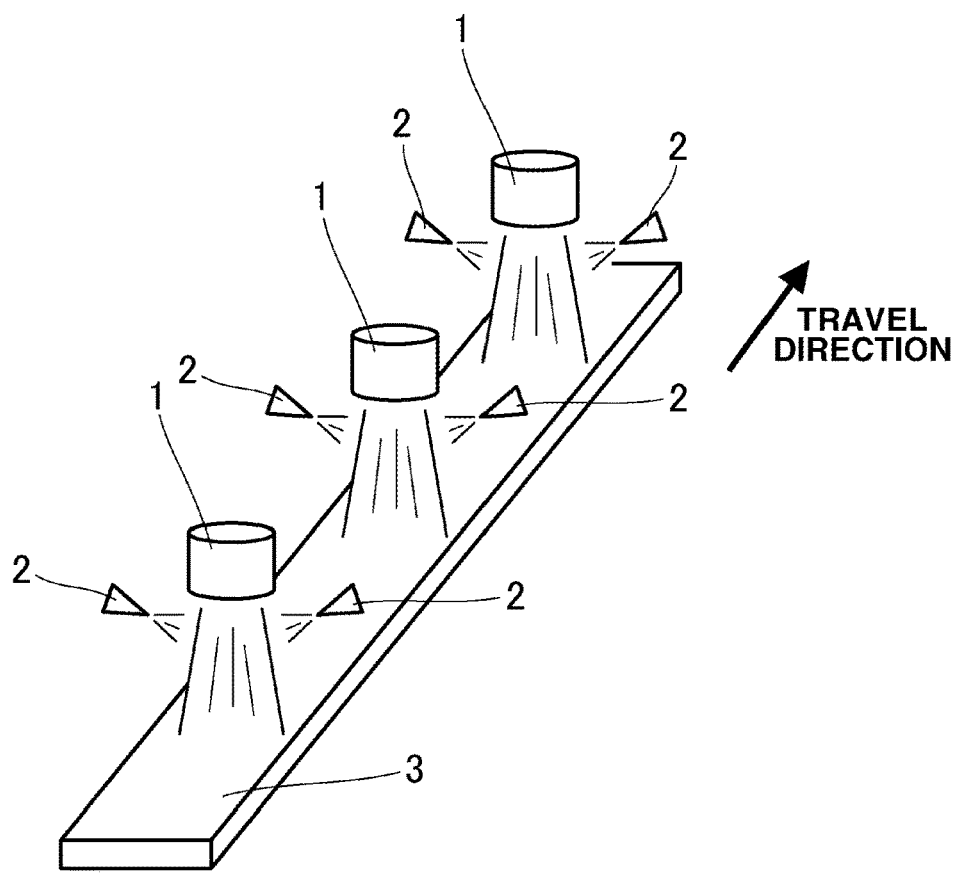
FIG. 2 is a perspective view illustrating one exemplary step of applying the inventive mineral fiber-treating binder to mineral fibers.

Referring to FIGS. 1 and 2, one exemplary process for manufacturing a mineral fiber mat using the inventive mineral fiber-treating binder is described. FIG. 1 is a schematic view illustrating one embodiment of the process for manufacturing a mineral fiber mat using the inventive mineral fiber-treating binder. FIG. 2 is a perspective view illustrating one exemplary step of applying the inventive mineral fiber-treating binder to mineral fibers.

The process starts with a fiberizing step of spinning mineral fibers such as glass wool through a fiberizing unit 1. The fiberization method by the fiberizing unit 1 is not particularly limited, and may be selected from prior art well-known methods such as centrifugal and blow-off fiberization methods. A plurality of fiberizing units 1 may be installed in accordance with the desired density, thickness and width of a mineral fiber mat 7 to be manufactured.

Next, the binder is applied from a binder applicator 2 to mineral fibers 3 which have been spun from the fiberizing unit 1, as shown in FIG. 2. For binder application, any prior art well-known applying techniques may be employed. For example, the aforementioned aqueous binder solution may be used and applied as by spraying. The solution is perpendicularly or obliquely sprayed to flying fibers so that the binder may deposit on mainly crossings or entanglements of fibers and other portions.

A conveyor 41 is a unit for stacking mineral fibers 3 having uncured binder deposited thereon on a perforated conveyor. The conveyor 41 is preferably a perforated conveyor coupled with a suction unit in order to lay fibers as a uniform layer.

It is noted that the amount of binder deposited is determined by the heat loss method or loss-of-ignition (LOI) method. Specifically, the amount of binder deposited refers to a weight loss which is determined after a dry sample of mineral fiber mat having binder deposited thereon is intensely heated at about 550° C.

The binder-applied mineral fibers 3 stack on the conveyor 41 disposed below the fiberizing units 1 to form a stack which is continuously carried to a conveyor 42 which is arranged in line with the conveyor 41. The stack of mineral fibers 3 is compressed to a predetermined thickness between the conveyor 42 and a conveyor 5 which is opposed to the conveyor 42 at a predetermined spacing while it enters a shaping furnace 6 which is disposed around the conveyors 42 and 5.

In the shaping furnace 6, the inventive binder applied to the mineral fibers 3 is heat cured, whereby a mineral fiber mat 7 having the predetermined thickness is formed. The processing conditions may be set as appropriate because they largely vary with the line length and the like. In this embodiment, for example, the heating temperature is preferably 150 to 300° C., more preferably 180 to 250° C. If the heating temperature is below 150° C., water may not completely evaporate from the mineral fiber mat 7. If the temperature is above 300° C., the binder in the treated mineral fiber mat 7 can be carbonized. The heating time is preferably 120 to 360 seconds, more preferably 180 to 300 seconds. If the heating time is shorter than 120 seconds, water may not completely evaporate from the mineral fiber mat 7. If the time is longer than 360 seconds, the binder in the treated mineral fiber mat 7 can be carbonized. The mineral fiber mat 7 thus shaped is fed to a conveyor 43 where the mat is cut to a predetermined product size by a cutter 8 which is disposed above the conveyor 43. The mineral fiber mats 7 are then carried by a conveyor 44 to a place where they are wrapped or packed.

The inventive mineral fiber mat manufactured in this way has an excellent recovery rate and high surface strength as compared with the mineral fiber mats treated with the ever proposed binders including phenolic resin-based binders. Additionally, the release of volatile organic compounds from the mineral fiber mat is minimized.

Notably, the formaldehyde emission rate is classified into several levels by JIS. Specifically, the formaldehyde emission rate is broken down into three grades of F to F according to JIS-A9504. Of these grades, F grade corresponds to a formaldehyde emission rate of up to 5 $\mu g/m^2 \cdot h$, F* grade corresponds to a rate of more than 5 $\mu g/m^2 \cdot h$ to 20 $\mu g/m^2 \cdot h$, and F grade corresponds to a rate of more than 20 $\mu g/m^2 \cdot h$ to 120 $\mu g/m^2 \cdot h$. F grade is the best. A mineral fiber mat which is manufactured using the inventive mineral fiber-treating binder is assigned to F** grade when tested by the chamber method of JIS A1901.

The recovery rate of a mineral fiber mat is defined herein as a ratio of the thickness of the mat after recovery to the thickness of the mat prior to compression when the mat is compressed by application of an external force and allowed to recover after removal of the external force. One common practice aiming to increase the efficiency of storage and transportation is to assemble a certain number of mineral fiber mats, compress the assembly, and pack it. If the mineral fiber mats taken out after unpacking fail to resume the thickness prior to compression, that is, if the recovery rate of mats is low, these mats may fail to achieve a thermal insulating or sound-proofing function to the full extent.

EXAMPLES

Preparation Examples, Examples and Comparative Examples are given below for illustrating the invention, but the invention is not limited thereto. In the following Examples, parts and % each are by weight.

Examples 1 to 6

An aqueous solution of a mineral fiber-treating binder was prepared by dissolving 100 parts of polyvinyl alcohol as shown in Table 1, 10 parts of colloidal silica "ST-50T", to and 5 parts of an ammonia-modified isobutylene/maleic anhydride copolymer in deionized water to a concentration of 2 wt %. A glass wool piece having dimensions of 10 cm long×10 cm wide×0.5 cm thick and a density of 0.025 g/cm³ was furnished as the mineral fiber and treated by spraying the aqueous binder solution thereto and heating under treatment conditions: 200° C. and 300 seconds for drying. In this way, twelve mineral fiber mats were manufactured. The mineral fiber mats were stacked to a thickness of 10 cm. The resulting mineral fiber mat had a density of 0.015 g/cm³. The amount of the binder used to treat the mineral fiber mat was adjusted such that the amount of binder deposited on mineral fibers was 4 wt % as solids based on the weight of the treated mineral fiber mat.

Examples 7 to 11

Aqueous solutions of mineral fiber-treating binders were prepared by the same procedure as in Example 2 except that colloidal silicas as shown in Table 1 having a particle size varying from 4 nm to 100 nm were used. Mineral fiber mats were manufactured as in Example 2.

Examples 12 and 13

Aqueous solutions of mineral fiber-treating binders were prepared by the same procedure as in Example 2 except that the amount of the colloidal silica was changed to 3 parts and 40 parts. Mineral fiber mats were manufactured as in Example 2.

Examples 14 and 15

Aqueous solutions of mineral fiber-treating binders were prepared by the same procedure as in Example 2 except that the amount of the crosslinker was changed to 3 parts and 10 parts. Mineral fiber mats were manufactured as in Example 2.

Comparative Example 1

An aqueous solution of a mineral fiber-treating binder was prepared by the same procedure as in Example 1 except that a phenolic resin "Shonol BRL-1015" (water-soluble phenolic resin by Showa Highpolymer Co., Ltd.) was used instead of the polyvinyl alcohol. A mineral fiber mat was similarly manufactured.

Comparative Example 2

An aqueous solution of a mineral fiber-treating binder was prepared by the same procedure as in Example 2 except that colloidal silica was not used. A mineral fiber mat was similarly manufactured.

Comparative Example 3

An aqueous solution of a mineral fiber-treating binder was prepared by the same procedure as in Example 2 except that colloidal silica "MP-2040" was used instead of colloidal silica "ST-50T". A mineral fiber mat was similarly manufactured.

Evaluation Tests

The mineral fiber mats of Examples 1 to 15 and Comparative Examples 1 to 3 were measured for recovery rate and formaldehyde emission rate. Notably, the formaldehyde emission rate was measured according to JIS A1901.

<Recovery Rate of Mineral Fiber Mat>

Once mineral fiber mats were packed, a mat sample of 10 cm×10 cm×10 cm was taken out of the pack. It was placed under a load of 20 kg for 1 hour. The thickness dx of the mat after loading was measured. A recovery rate was computed according to the following equation (1) wherein n=5. The results are shown in Table 1.

$$R = (dx/d) \times 100 \tag{1}$$

R: recovery rate (%)
dx: thickness (mm) of the mineral fiber mat after recovery
d: nominal thickness (mm) of the mineral fiber mat prior to the test <Formaldehyde Emission Rate>

A mineral fiber mat was taken out of the pack and cut into a piece having a surface area of 440 cm², which was used as a specimen for measuring a formaldehyde emission rate. Measurement conditions for formaldehyde emission rate included a test period of 7 days, a chamber temperature of 28° C., a relative humidity of 50%, a chamber volume of 20 L, and a ventilation cycle of 0.5 per hour. For sampling, a 2,4-dinitrophenylhydrazine (DNPH) silica short body (Waters Corp.) was used. The air in the chamber was collected in a collecting volume of 10 L at a collecting flow rate of 167 mL/min. The concentration of the carbonyl compound was measured using acetonitrile as solvent. The formaldehyde emission rate was determined from the measurement according to JIS A1901 and JIS A1902. The results are also shown in Table 1.

<Storage Stability of Treatment Solution>

Treatment solutions were allowed to stand at normal temperature for one month, after which their state was visually observed.

○: treatment solution showed no separation
×: treatment solution separated or gelled When a treatment solution separates or gels, sometimes it cannot be sprayed because of nozzle clogging.

ISOBAM-104 in Table 1 is an ammonia-modified isobutylene/maleic anhydride copolymer by Kuraray Co., Ltd., which has a weight average molecular weight of 55,000-65,000 and the following chemical structural formula wherein n=0.7-0.8 wt % and m=99.2-99.3 wt %.

[Chem. 4]

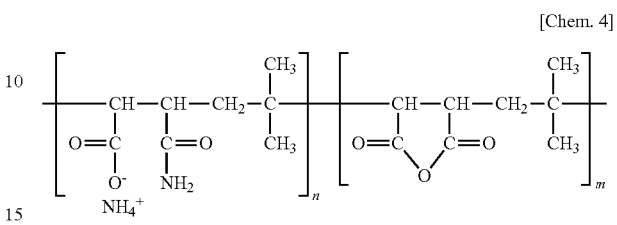

REFERENCE SIGNS LIST

1 Fiberizing unit
2 Binder applicator
3 Mineral fibers
41, 42, 43, 44, 5 Conveyors
6 Shaping furnace
7 Mineral fiber mat
8 Cutter

TABLE 1

| Formulation: Parts by weight | | 1 | 2 | 3 | 4 | 5 | 6 | 7 | 8 | 9 | 10 | 11 | 12 | 13 | 14 | 15 | Comparative Example 1 | Comparative Example 2 | Comparative Example 3 |
|---|---|---|---|---|---|---|---|---|---|---|---|---|---|---|---|---|---|---|---|
| Polyvinyl alcohol | JF-05 | 100 | | | | | | | | | | | | | | | | | |
| | JP-05 | | 100 | | | | | 100 | 100 | 100 | 100 | 100 | 100 | 100 | 100 | 100 | | 100 | 100 |
| | JL-05E | | | 100 | | | | | | | | | | | | | | | |
| | JM-17 | | | | 100 | | | | | | | | | | | | | | |
| | JC-25 | | | | | 100 | | | | | | | | | | | | | |
| | JP-33 | | | | | | 100 | | | | | | | | | | | | |
| Colloidal silica | ST-XS | | | | | | | 10 | | | | | | | | | | | |
| | ST-30 | | | | | | | | 10 | | | | | | | | | | |
| | ST-50T | 10 | 10 | 10 | 10 | 10 | 10 | | | | | | 3 | 40 | 10 | 10 | | | |
| | ST-30L | | | | | | | | | 10 | | | | | | | | | |
| | ST-ZL | | | | | | | | | | | 10 | | | | | | | |
| | MP-2040 | | | | | | | | | | | | | | | | | | 10 |
| | Ludox TMA | | | | | | | | | | 10 | | | | | | | | |
| Phenol | Shonol BRL-1015 | | | | | | | | | | | | | | | | 100 | | |
| Crosslinker | ISOBAM-104 | 5 | 5 | 5 | 5 | 5 | 5 | 5 | 5 | 5 | 5 | 5 | 5 | 5 | 3 | 10 | | 5 | 5 |
| Tests | Recovery rate (%) | 71 | 70 | 69 | 72 | 72 | 71 | 65 | 66 | 70 | 69 | 71 | 65 | 72 | 69 | 71 | 71 | 60 | 65 |
| | Formaldehyde emission rate (μm²·h) | <5 | <5 | <5 | <5 | <5 | <5 | <5 | <5 | <5 | <5 | <5 | <5 | <5 | <5 | <5 | 30 | <5 | <5 |
| | Storage stability | ○ | ○ | ○ | ○ | ○ | ○ | ○ | ○ | ○ | ○ | ○ | ○ | ○ | ○ | ○ | × | ○ | × |

Note:
The blending amounts are calculated as solids.
The polyvinyl alcohols in Table 1 are identified below.
JF-05 (fully saponified Poval: degree of saponification 98-99%, degree of polymerization 500)
JP-05 (partially saponified Poval: degree of saponification 87-89%, degree of polymerization 500)
JL-05E (partially saponified Poval: degree of saponification 80-84%, degree of polymerization 500)
JM-17 (medium saponified Poval: degree of saponification 95-97%, degree of polymerization 1,700)
JC-25 (fully saponified Poval: degree of saponification 99-99.4%, degree of polymerization 2,500)
JP-33 partially saponified Poval: degree of saponification 87-89%, degree of polymerization 3,300)
All are available from Japan Vam & Poval Co., Ltd.
The colloidal silicas in Table 1 are identified below.
ST-XS (Snowtex by Nissan Chemical Corp.: particle size 4-6 nm, $Na^+$-stabilized alkaline sol)
ST-30 (Snowtex by Nissan Chemical Corp.: particle size 10-15 nm, $Na^+$-stabilized alkaline sol)
ST-50T (Snowtex by Nissan Chemical Corp.: particle size 20-25 nm, $Na^+$-stabilized alkaline sol)
ST-30L (Snowtex by Nissan Chemical Corp.: particle size 40-50 nm, $Na^+$-stabilized alkaline sol)
ST-ZL (Snowtex by Nissan Chemical Corp.: particle size 70-100 nm, $Na^+$-stabilized alkaline sol)
MP-2040 (Snowtex by Nissan Chemical Corp.: particle size 170-230 nm, $Na^+$-stabilized alkaline sol)
Ludox TMA (W. R. Grace Japan K.K.: particle size 20-25 nm, aluminum-modified colloidal silica)

The invention claimed is:

1. A mineral fiber-treating binder comprising:
   (A) 100 parts by weight of a polyvinyl alcohol-based resin having a degree of polymerization of 100 to 3,500,
   (B) 3 parts to 40 parts by weight of colloidal silica having an average particle size of up to 100 nm, and
   (C) 3 parts to 10 parts by weight of an ammonia-modified copolymer containing maleic anhydride.

2. The binder of claim 1 wherein the polyvinyl alcohol-based resin (A) has a degree of saponification of at least 70 mol %.

3. The binder of claim 1 wherein the colloidal silica (B) is aluminum-modified colloidal silica.

4. The binder of claim 1 wherein the ammonia-modified copolymer containing maleic anhydride (C) has a weight average molecular weight of 50,000 to 300,000.

5. The binder of claim 4 wherein the ammonia-modified copolymer containing maleic anhydride (C) is an ammonia-modified isobutylene/maleic anhydride copolymer.

6. The binder of claim 1 wherein the mineral fiber is glass wool or mineral wool.

7. A mineral fiber mat comprising mineral fibers treated with the binder of claim 1.

8. The binder of claim 1 wherein the binder comprises 10 parts to 40 parts by weight of the colloidal silica (B).

9. The binder of claim 1 wherein the binder comprises 5 parts to 10 parts by weight of the ammonia-modified copolymer containing maleic anhydride (C).

10. The binder of claim 1 wherein the average particle size of the colloidal silica (B) is 4 nm to 100 nm.

* * * * *